United States Patent Office 3,634,376
Patented Jan. 11, 1972

3,634,376
PROCESS FOR THE PRODUCTION OF POLYMERS OF CYCLOPENTENE
Karl Nutzel, Opladen, and Friedrich Haas, Cologne-Buchheim, Germany, assignors to Farbenfabriken Bayer AG, Leverkusen, Germany
No Drawing. Filed Apr. 25, 1969, Ser. No. 819,474
Claims priority, application Germany, May 9, 1968,
P 17 70 366.1
Int. Cl. C08f 7/02, 15/04
U.S. Cl. 260—88.2 R
5 Claims

ABSTRACT OF THE DISCLOSURE

Process for producing polymers of cyclopentene wherein a reaction product of tungsten hexachloride and a metal peroxide is added to a solution of cyclopentene and if desired, other monomers in an inert solvent, the solution is left until a colour change from blue-black to red occurs, an organometallic compound of a metal of Groups I to III of the Periodic System is added and the polymer formed is isolated.

A PROCESS FOR THE PRODUCTION OF POLYMERS OF CYCLOPENTENE

Polymers of cyclopentene having the structure of a polypentenamer can be prepared by polymerising cyclopentene with a catalyst comprising a molybdenum or tungsten salt, an organometallic compound and a compound containing oxygen-oxygen bonds. The polymerisation reaction is preferably carried out in the absence of solvents, because in those instances where a solvent is used, the yields obtained are inadequate (cf. British patent specification No. 1,062,367).

This invention relates to an improvement in the above-described process. In the first place it is desirable for various technical reasons to carry out the polymerisation of cyclopentene in a solvent: Any polymerisation reaction is much easier to control when carried out in a solvent. Gel-formation, which necessitates time-consuming purifying operations, can be avoided and the requirements imposed upon the purity of the monomers are not quite so stringent. Unfortunately, the practical performance of the polymerisation of cyclopentene in solution has always been hampered by a totally inadequate yield and an equally inadequate reaction velocity. Accordingly, it has never been possible to carry out the aforementioned polymerisation process in solution on a commercial scale.

A process for the production of polymers and copolymers of cyclopentene in solution, using a mixed catalyst comprising a tungsten compound and an organometallic compound, has now been found which comprises the following steps: The reaction product of tungsten hexachloride and an alkali metal or alkaline earth metal peroxide is added to a polymerisation solution containing a solvent and cyclopentene, and, optionally, one or more other monomers, at a temperature above 0° C., the product is left until it changes colour from blue-black to cherry red, an organometallic compound of an element of the first to third groups of the Periodic System is added at a temperature of from +30° C. to —30° C., and the polymer is isolated from the solution on completion of polymerisation.

This procedure may be applied to the homopolymerisation of cyclopentene and to the copolymerisation of cyclopentene with other olefins, for example bicyclic olefins, preferably with a molecular weight of from 93 to 132, such as dicyclopentadiene, norbornadiene, norbornene, cyclooctadiene, bicyclo-2-octene and others. As a rule, the comonomer is used in a quantity of up to 30% by weight and preferably at least 1% by weight, based on cyclopentene.

Compared with polypentenamer, the copolymers of cyclopentene and dicyclopentadiene obtained in accordance with the invention have the following additional bands in the infra-red spectrum: 3030 cm.$^{-1}$, 1440 cm.$^{-1}$, 1358 cm.$^{-1}$, 1280 cm.$^{-1}$ and 730 cm.$^{-1}$.

The polymers and copolymers obtained in accordance with the invention preferably have a predominantly trans-structure.

The reaction product of tungsten hexachloride and the alkali metal or alkaline earth metal peroxide is preferably prepared separately. For this purpose, tungsten hexachloride is dissolved in a suitable solvent, the finely powdered alkali metal peroxide or alkaline earth metal peroxide is added in a molar ratio of from 0.5 to 3, and the resulting mixture is left until the peroxide has dissolved completely. The weakly exothermic reaction may be accelerated by stirring or shaking the mixture. Glass beads or similar structures may also be added to accelerate the reaction. In general, the reaction is carried out in room temperature although it is also possible to operate at an elevated temperature, up to the boiling point of the solvent used. Preferred solvents include aromatic hydrocarbons such as toluene or benzene. Preferred peroxides include sodium peroxide and barium peroxide. The reaction product obtained from this reaction is used as a solution in the organic solvent.

In general, the process is carried out by adding first the tungsten hexachloride peroxide reaction product and then the organometallic compound to the solution of cyclopentene in an inert organic solvent at a temperature above 0° C., preferably +5 to +30° C. Precautions should be taken to ensure the absence of moisture and oxygen. Accordingly, it is best to work in an inert gas atmosphere (e.g. nitrogen or argon). The polymerisation reaction is accompanied by a moderate increase in the temperature of the solution. Following the addition of a deactivator and of an anti-ager, the polymer can be isolated by precipitation, for example with a lower alcohol or by treating the solution with steam. The organometallic compound must be added after the tungsten hexachloride reaction product.

Suitable solvents include, in particular, aliphatic and aromatic hydrocarbons, aromatic hydrocarbons being preferred. Toluene or chlorinated benzenes are preferably used as the solvents.

Organic compounds of elements of the first to third groups of the Periodic System include, in particular, alkyl and alkyl halide compounds of beryllium, magnesium, zinc, boron and, preferably, aluminium. The alkyl groups in these compounds preferably contain from 1 to 12 carbon atoms. The preferred halogen is chlorine. Examples of these compounds include aluminium trialkyls of the formula $AlR_3$, in which each R represents an alkyl group with from 1 to 12 carbon atoms, and aluminium alkyl halides of the formula $AlR_{2-n}Hal_n$ in which each R has the meaning given above, Hal represents a halogen (e.g. chlorine) and $n$ represents 1 or 2. Examples of these compounds include aluminium triethyl, aluminium tributyl, and, preferably, aluminium triisobutyl; and also aluminium diisobutyl chloride, aluminium diethyl chloried and aluminium sesquichloride.

The compounds of beryllium, magnesium, zinc and boron are also of the formula $MR_xHal_y$ wherein $x+y$ represents the valency of the metal, but $x$ is at least 1, M is one of the above mentioned metals, R and Hal are defined as above. Examples of these compounds are: $Be(C_2H_5)_2$, $Mg(C_3H_7)_2$, $Zn(C_2H_5)_2$, $B(C_4H_9)_3$.

In a modification of the process, however, it is also possible though not as effective, to react the tungsten hexachloride with the alkali metal or alkaline earth metal peroxide directly in the polymerisation medium in the presence of the cyclopentene, rather than separately.

In general, the organometallic compound is used in a quantity from 0.5 to 3 mols per mole of tungsten hexachloride.

Any proton-active substance may be used as deactivator, although it is of particular advantage to use proton-active substances of a type which converts the metals used into water- and/or alcohol/soluble complexes, such as primary and secondary amines or amino-alcohols. The stabilisers used are preferably non-discolouring phenols, such as 2,5-di-tert.-butyl-4-methyl phenol or 3,3'-dimethyl-5,5'-di-tert.-butyl-6,6-dihydroxy diphenyl methane.

The polymers obtained by the process according to the invention are elastomers. They are transparent and contain more than 90% or even more than 95% of trans-bonds. The polymerisation reaction proceeds very quickly. Conversion of 85% and more within one hour can be obtained. The catalysts used in accordance with the invention do not lower the molecular weight, so that in no way do they act as regulators or chain-transfer agents.

In the following examples, all manipulations are carried out in an inert gas atmosphere of ultra-pure nitrogen.

EXAMPLE 1 (COMPARISON EXAMPLE)

175 ml. of toluene and 60 ml. of cyclopentene are introduced into a 500 ml.-capacity 3-necked flask equipped with a gas-tight stirrer, a thermometer and a nitrogen inlet. 0.25 g. (0.63 mmol) of $WCl_6$ dissolved in 10 cc. of toluene are then added and the mixture is cooled after 15 minutes to $-5°$ C. 0.168 g. (0.85 mmol) of aluminium triisobutyl are then added. The previously dark red colour changes to black/brownish-red. After one hour, a mixture of 10 ml. of methanol and 2 ml. of aminoethanol, is added to the solution which is homogenised by intense stirring followed by the introduction of 0.2 g. of 3,3-dimethyl-5,5'-di-tert.-butyl-6,6'-dihydroxy diphenyl methane. The polymer is precipitated by a 5-fold excess of the methanol band on the solution. After drying, 3.7 g. of a non-transparent solid elastic product are obtained, having 92.5% of trans-bonded units and a specific viscosity of 1385 g./ml./g. at 20° C. (0.5% by weight solution in toluene).

EXAMPLE 2

2.5 g. of $WCl_6$ are dissolved in 98.5 ml. of dried toluene (less than 5 p.p.m. of water) and the resulting solution is shaken for 24 hours with 0.5 g. of sodium peroxide following the addition of glass beads. In the first 4 hours, the mixture undergoes an increase in temperature to 37.8° C. being subsequently cooled again. The solution changes its colour from blue to blue-black. 10 ml. of this blue-black suspension are added to the polymerisation mixture described in Example 1, in place of the $WCl_6$ used in that example. Following the addition of aluminium triisobutyl at $-5°$ C. the solution immediately becomes viscous. After 1 hour, 37 g. of a transparent colourless polymer are obtained, having a specific viscosity (0.5% by weight solution in toluene at 20° C.) of 1410 ml./g. and 95.5% of trans-bonded units. The yield thus comprises 80.5%.

EXAMPLE 3

As described in Example 2, 2.5 g. of $WCl_6$ are reacted with 0.75 g. of powdered $Na_2O_2$. 10 ml. of this solution are added to the polymerisation mixture according to Example 1, in place of the $WCl_6$ used in that example. After working up, the yield comprises 40 g. or 86.5% of the theoretical. The product contains 94.8% of trans-bonded units and has a specific viscosity of 1280 ml./g. (0.5% by weight solution in toluene at 20° C.).

EXAMPLE 4

As in Example 3, 2.5 g. of $WCl_6$ are reacted with 1.5 g. of $Na_2O_2$. 10 ml. of the mixture are added to the polymerisation mixture according to Example 1, instead of 0.25 g. of $WCl_6$. After 1 hour, the yield comprises 29 g. or 63%. The product contains 93.8% of trans-bonded units.

EXAMPLE 5

The procedure is as described in Example 1, except that following the addition of the $WCl_6$ 0.05 g. of finely powdered $Na_2O_2$ suspended in toluene are added, and the mixture is stirred for another 20 minutes at room temperature before the aluminium triisobutyl is added. After working up, the yield comprises 21 g. or 45% of the theoretical. The product contains 93.5% of trans-bonded units.

EXAMPLE 6

The procedure is as described in Example 1, except that, following the addition of the $WCl_6$, 0.1 g. of $BaO_2$ suspended in toluene are added, and the mixture is stirred for another 20 minutes before cooling. The yield comprises 11 g. or 24% of the theoretical. The product has a specific viscosity (0.5% by weight solution in toluene at 20° C.) of 1138 ml./g. and contains 92.7% of trans-bonded units.

EXAMPLE 7

2.5 g. of $WCl_6$ and 1 g. of $BaO_2$ are shaken for 24 hours in 98 ml. of dry toluene. 10 ml. of this mixture are used in the polymerisation mixture according to Example 1 instead of 0.25 g. of $WCl_6$. After 1 hour, polypentenamer is obtained in a yield of 22 g. or 48% of the theoretical.

EXAMPLE 8

2.5 g. of $WCl_6$ and 0.5 g. of $Na_2O_2$ are boiled under reflux for 18 hours in 98 ml. of toluene. 10 ml. of the blue-black mixture are used in the polymerisation mixture according to Example 1 instead of 0.25 g. of $WCl_6$. After 1 hour, a transparent polypentenamer is obtained in a yield of 28 g., its trans-bonded content being 94.8% and its specific viscosity 1420 ml./g. (0.5% solution in toluene at 20° C.).

We claim:
1. A process for producing a cyclopentene polymer of greater than 90% trans-configuration which comprises adding the reaction product of tungsten hexachloride and an alkali or alkaline earth metal peroxide to a solution of cyclopentene in an inert solvent at a temperature between 0 and 30° C., allowing the mixture to change color from blue-black to red, adding a compound of the formula

$$MR_xCl_y$$

to resulting mixture at a temperature of from $-30$ to 30° C. and subsequently recovering resulting polymer, M being a metal of Groups I–III of the Periodic System, R being alkyl having 1 to 12 carbon atoms, $x$ plus $y$ being the valency of M and $x$ being at least 1.

2. The process of claim 1 wherein said metal is beryllium, magnesium, zinc, boron or aluminum.

3. The process of claim 1 wherein 0.5 to 3 mols of alkali or alkaline earth metal peroxide and 1 mol of tungsten hexachloride are reacted to form said reaction product of tungsten hexachloride and said peroxide.

4. The process of claim 1 wherein 0.5 to 3 mols of said alkyl or alkyl halide compound of said metal are present per mol of tungsten hexachloride in said tungsten hexachloride reaction product.

5. The process of claim 1 wherein a bicyclic olefin of a molecular weight of from 93 to 132 is employed as a comonomer.

References Cited

UNITED STATES PATENTS 3,449,310  6/1969  Dall' Asta et al. ____ 260—93.1

JOSEPH L. SCHOFER, Primary Examiner
R. A. GAITHER, Assistant Examiner

U.S. Cl. X.R.

260—93.1